(12) United States Patent
DeLuca et al.

(10) Patent No.: US 8,856,664 B2
(45) Date of Patent: Oct. 7, 2014

(54) PROMPTING OF RECIPIENT EXPERTISE IN COLLABORATION ENVIRONMENT

(75) Inventors: Lisa Seacat DeLuca, San Francisco, CA (US); Soobaek Jang, Hamden, CT (US); Daniel C. Krook, Fairfield, CT (US)

(73) Assignee: International Business Machines Corporation, Armonk, NY (US)

( * ) Notice: Subject to any disclaimer, the term of this patent is extended or adjusted under 35 U.S.C. 154(b) by 231 days.

(21) Appl. No.: 13/479,378

(22) Filed: May 24, 2012

(65) Prior Publication Data

US 2013/0318447 A1      Nov. 28, 2013

(51) Int. Cl.
*G06F 3/00* (2006.01)
*G06F 3/048* (2013.01)

(52) U.S. Cl.
USPC ........... 715/752; 715/705; 715/707; 715/708; 715/751; 709/204; 709/206

(58) Field of Classification Search
CPC ...... G06F 17/30; G06Q 10/107; G06Q 30/02; H04L 51/00; H04L 51/04; H04L 51/32
USPC .......... 715/752, 707, 708, 705, 751; 709/204, 709/206
See application file for complete search history.

(56) References Cited

U.S. PATENT DOCUMENTS

| | | | |
|---|---|---|---|
| 7,657,554 B2 | 2/2010 | Murphy et al. | |
| 7,680,901 B2 | 3/2010 | Rechterman et al. | |
| 8,543,649 B2* | 9/2013 | Gilmour et al. | 709/206 |
| 2003/0115271 A1* | 6/2003 | Weissman | 709/206 |
| 2006/0064403 A1 | 3/2006 | Rechterman et al. | |
| 2008/0010356 A1 | 1/2008 | Rechterman et al. | |
| 2008/0168026 A1* | 7/2008 | Patil et al. | 707/2 |
| 2010/0268682 A1 | 10/2010 | Lewis et al. | |
| 2011/0022967 A1 | 1/2011 | Vijayakumar et al. | |
| 2013/0007037 A1* | 1/2013 | Azzam et al. | 707/769 |

\* cited by examiner

*Primary Examiner* — Ting Lee
(74) *Attorney, Agent, or Firm* — Cahn & Samuels, LLP

(57) ABSTRACT

A method for prompting expertise in a collaboration environment includes drafting a message for a collaboration environment in a graphical user interface; entering a name of at least one recipient for the message; obtaining expertise information about the at least one recipient; and highlighting at least one word of the message that is associated with the obtained expertise information in the graphical user interface.

20 Claims, 4 Drawing Sheets

US 8,856,664 B2

PROMPTING OF RECIPIENT EXPERTISE IN COLLABORATION ENVIRONMENT

BACKGROUND

The present invention is directed to a system and methods for working in a collaboration environment, in particular, for prompting of recipient expertise in a collaboration environment.

In today's collaborative work environments, it can be difficult to adjust the technical tone of a communication based on the audience or to recall quickly each recipient's expertise level. Information related to expertise level may be available on social networking sites, such as office profiles (ex. bluepages); LinkedIn®; IBMr; Facebook®; and the like. However, it is time-consuming and unreasonable for a sender to look up each recipient of a communication or message to determine his or her expertise on a given topic.

SUMMARY

According to an embodiment of the present invention, a method for prompting expertise in a collaboration environment includes drafting a message for a collaboration environment in a graphical user interface; entering a name of at least one recipient for the message; obtaining expertise information for the at least one recipient; and highlighting at least one word of the message that is associated with the obtained expertise information in the graphical user interface.

According to another embodiment of the present invention, a method for prompting expertise in a collaboration environment includes drafting a message in a graphical user interface; obtaining expertise information for at least one recipient based on a context of the message; highlighting at least one word of the message matching the obtained expertise information for at least one recipient in the graphical user interface; and changing the message in real-time based upon the obtained expertise information.

According to another embodiment of the present invention, a system for prompting expertise in a collaboration environment includes at least one electronic or digital device; a search engine for pulling or obtaining expertise information for at least one recipient of a message in a collaboration environment; a graphical user interface in communication with the search engine for displaying the message and the expertise information; and a controller for highlighting at least one of words or recipient names in the message corresponding to the expertise information.

According to another embodiment of the present invention, a computer program product for prompting expertise in a collaboration environment comprises a computer readable storage medium. First program instructions draft a message for a collaboration environment in a graphical user interface. Second program instructions enter a name of at least one recipient for the message. Third program instructions obtain expertise information for the at least one recipient. Fourth program instructions highlight at least one word of the message that is associated with the obtained expertise information in the graphical user interface. The first, second, third, and fourth program instructions are stored on the computer readable storage medium.

As used herein "substantially", "relatively", "generally", "about", and "approximately" are relative modifiers intended to indicate permissible variation from the characteristic so modified. They are not intended to be limited to the absolute value or characteristic which it modifies but rather approaching or approximating such a physical or functional characteristic.

In this detailed description, references to "one embodiment", "an embodiment", or "in embodiments" mean that the feature being referred to is included in at least one embodiment of the invention. Moreover, separate references to "one embodiment", "an embodiment", or "embodiments" do not necessarily refer to the same embodiment; however, neither are such embodiments mutually exclusive, unless so stated, and except as will be readily apparent to those skilled in the art. Thus, the invention can include any variety of combinations and/or integrations of the embodiments described herein.

Given the following enabling description of the drawings, the methods and systems should become evident to a person of ordinary skill in the art.

DETAILED DESCRIPTION

According to the present invention, systems and methods are provided to alert a sender of an electronic message in a collaboration environment of the expertise level of at least one recipient of the message. While the discussion below is directed to email, the present invention may be applied to any collaboration environment.

A collaboration environment may be synchronous or asynchronous and may include, but is not limited to, email messaging, social networking, blogs, group chats, shared web applications, shared web experiences (e.g., wikis); shared web browsing, web shopping sites, instant messaging, text messaging, online bulletin boards, shared whiteboards, shared document production, discussion forums, discussion threads, voice over IP (e.g., conference call monitoring), and the like.

According to the present invention, users of a collaboration environment can eliminate back-and-forth emails or conversation when the expertise of at least one participant in the collaboration environment is unknown. Accordingly, users can add and/or remove details in a message, thereby tailoring the message to an audience's knowledge level on any given topic. In one or more embodiments, users can adjust an email in real-time to better structure the message to at least one recipient.

Figure 1:
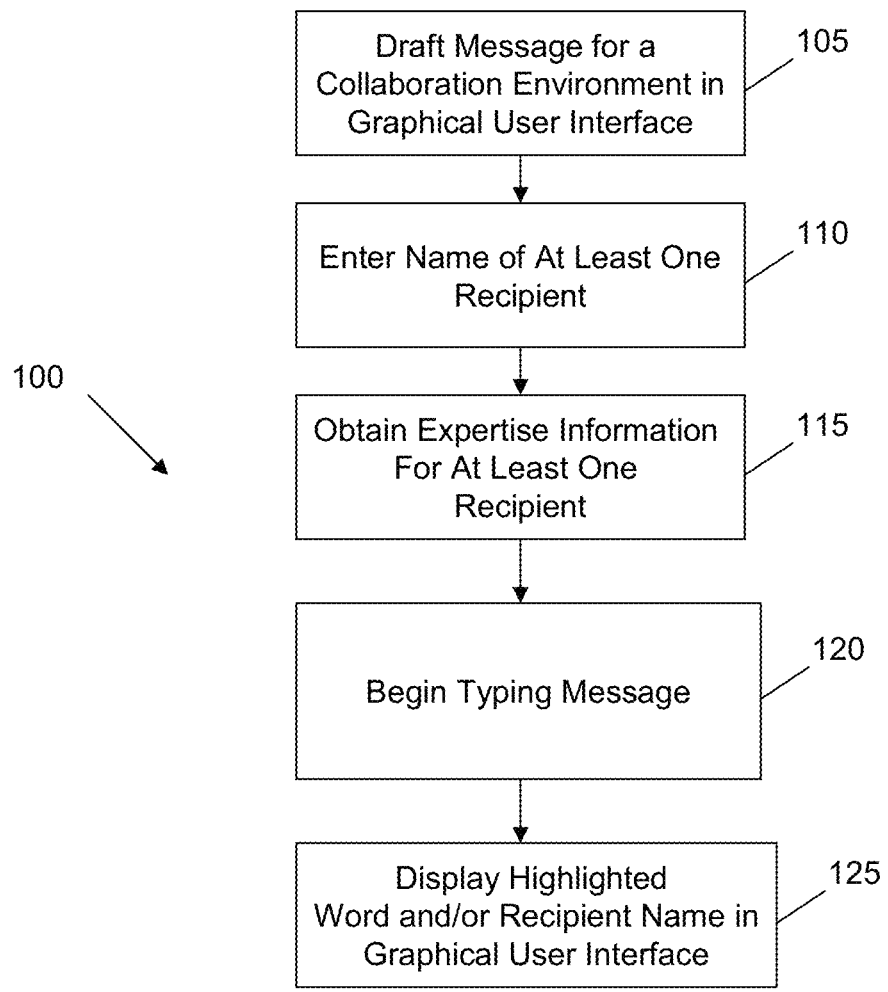
FIG. 1 is a flowchart of a method according to an embodiment of the present invention.

With reference now to FIG. 1, a method 100 according to an embodiment of the present invention is provided. A user of a collaboration environment drafts a message, such as an email or instant message, in a graphical user interface, 105. The user enters the name of at least one recipient of the message, 110. For example, the user adds at least one recipient using To, CC, or BCC fields in an email message. For common communications or interactions, a user may map email addresses of at least one recipient to a list of social contacts. Thus, recipients may be securely identified and associated across multiple accounts (for example, by using oAuth or OpenID).

Expertise information for the at least one recipient is obtained, 115. In one or more embodiments, expertise information for the at least one recipient may be pulled or obtained from at least one of: a company's internal computer system (e.g., bluepages, IBMr); an external or public social networking site (e.g., LINKEDIN®, FACEBOOK®, TWITTER®); public records (e.g., from a local, state, or federal government entity or agency, for example, U.S. Patent and Trademark Office); manual tagging by a user; collaborative tagging; or reputation score (e.g., Mixtent, Klout). A tag is a keyword or term associated with or assigned to a piece of information, and in embodiments, enables at least one of keyword-based classification, search, or sharing of information. In at least one embodiment, the source of the expertise information may be chosen by a user according to a user preference.

The user begins typing or entering words comprising the message, 120. When a word is typed that is associated with obtained expertise information for at least one recipient, the word is highlighted in the user's graphical user interface, 125. For example, the expertise information may comprise at least one typed word.

According to one or more embodiments of the present invention, the highlighted word may include, but is not limited to, at least one of an animation, media file, a change of style, or web linkage. An animation may include, but is not limited to, flashing, symbols, or the like. A change of style may include, but is not limited to, at least one of a change of color, a change of font size, background color, font weight (e.g., bold, italic), font family, or font decoration (e.g., underline). As the user continues to type the message, the highlighting associated with a word may be modified or removed.

In at least one embodiment, a user or sender may hover over a highlighted word to view (e.g., via a balloon, list, or menu) which at least one recipient matches the highlighted expertise information, thereby allowing the user to modify the message accordingly. Additional information about a source of the expertise information may also be displayed.

At least one recipient's name may be highlighted or styled in a manner similar to a highlighted word to reflect the obtained expertise information, 125. In one or more embodiments, the name of at least one recipient may be color coded, for example, a recipient with a higher level of expertise may be colored green, while recipients with a lower level of expertise may be colored yellow, and recipients with no level of expertise may be colored red. In one or more embodiments, the least one recipient may be assigned an expertise number that may be displayed next to his or her name (e.g., Bob 10, Sue 5, Bill 0). In a specific embodiment, recipients' names may appear via a tag-cloud display (e.g., recipients with a higher expertise level for a topic are displayed larger than those with less or no expertise). The manner of highlighting of a word and/or recipient name may be chosen by a user according to a user preference.

According to one or more embodiments, at least one expert may be recommended based on content of a message or a recipient list. The recommendation may include adding at least one expert/recipient based on addition of a word to a message and/or deleting at least one expert/recipient based on removal or deletion of a word from a message.

If at any point a user adds a new recipient to a draft message, the entire message may be re-scanned to obtain expertise information for the new recipient.

According to one or more embodiments, when a user sends a message (e.g., email), all of the expertise information may be stored locally with the sent message or removed based on a user preference.

According to one or more embodiments, an invitation (e.g., via a calendar or email invite) may display the overall knowledge level of an audience, for example, when a user needs to present or discuss a given topic. Thus, a user may set the expertise level of a presented topic prior to a meeting.

Figure 2:
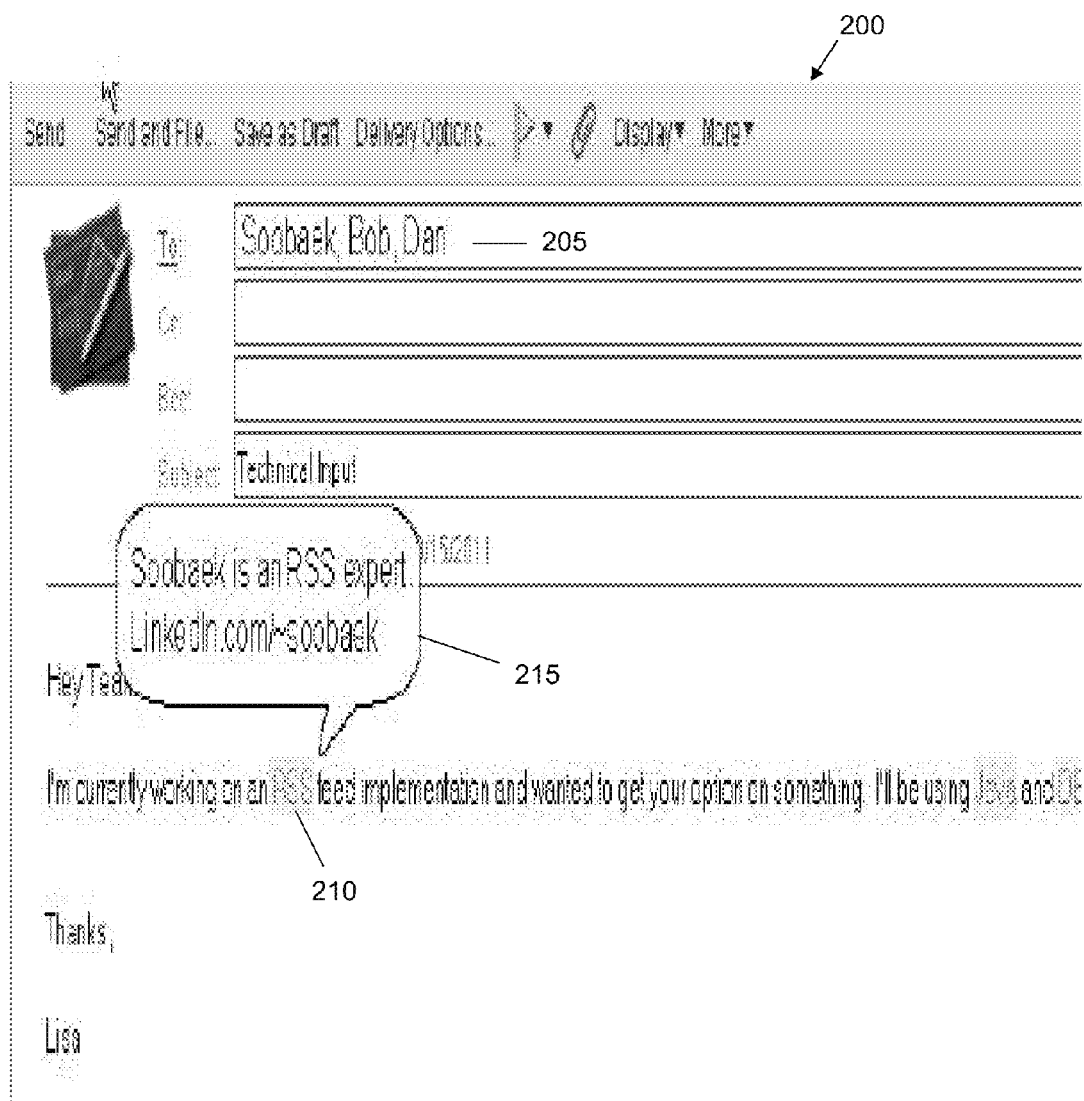
FIG. 2 is a screenshot of a graphical user interface according to an embodiment of the present invention.

With reference now to FIG. 2, Lisa drafts an email 200 to a set of developers that she has never worked with before. She includes Soobaek, Bob, and Dan on the email in a "To:" line, 205. She types "I'm currently working on an RSS feed implementation . . . ". The system recognizes that RSS corresponds to expertise information for a recipient and highlights the word RSS, 210. Lisa may hover over the highlighted RSS word to see exactly which recipient (i.e., Soobaek) is an RSS expert and the source of the expertise information (i.e., LinkedIn), 215. Lisa can then modify her email, for example, to say: "Soobaek, I know that you're an expert on RSS feeds, what are your thoughts on my design". Thus, Lisa is able to adjust her email in real-time to target her desired audience.

The present invention allows an email to be modified to include or add technical details for those recipients who do not have expertise on a given topic. Thus, in one or more embodiments, there may be different versions of a message depending upon the at least one recipient and expertise information. For example, if Lisa wanted to explain what RSS was, then recipient Soobaek would not need to see that section of the email, or version of the email, as he is already an expert.

Figure 3:
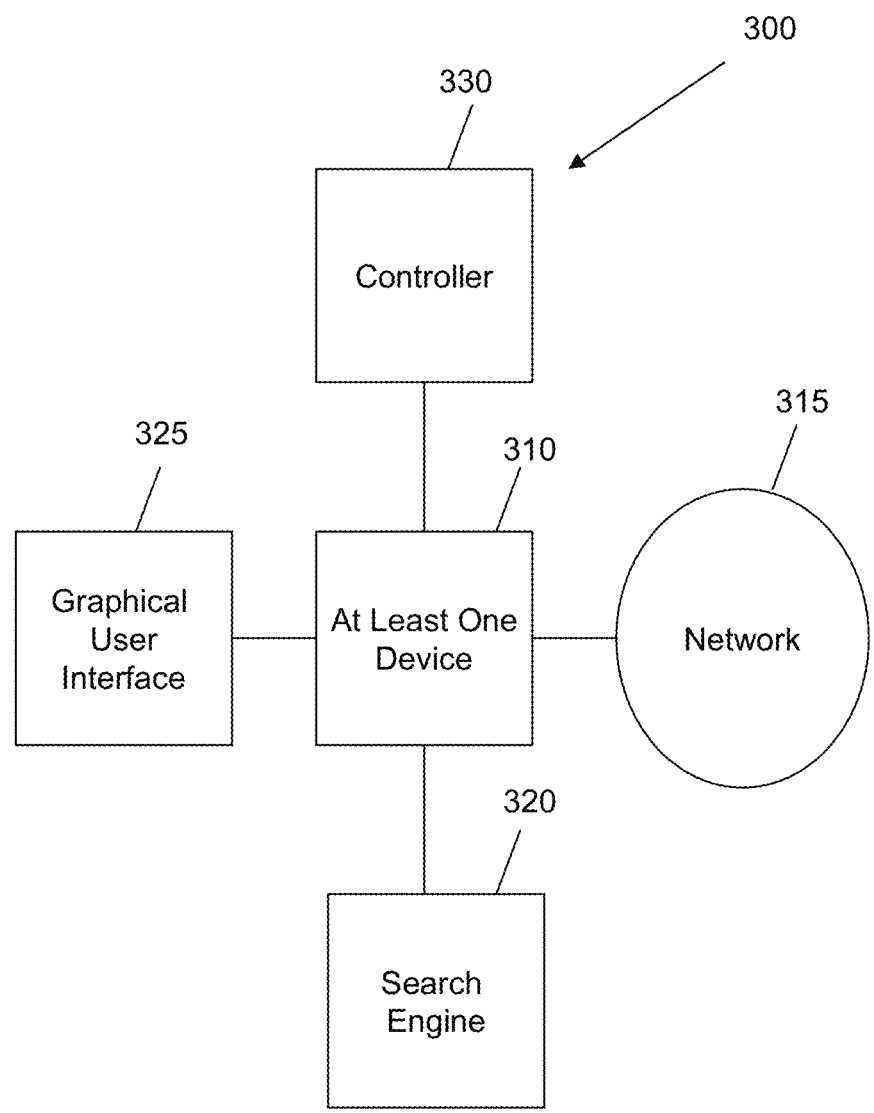
FIG. 3 is a schematic diagram of a system according to an embodiment of the present invention.

With reference now to FIG. 3, a schematic diagram illustrates a system 300 according to an embodiment of the present invention. The system includes at least one electronic or digital device 310 (e.g., a personal computer, cellular telephone, tablet computer, personal digital assistant, game device, MP3 player, television). The at least one device may be connected to a network 315 (e.g., the internet, World Wide Web, intranet, local area network (LAN), wide area network (WAN)). The system also includes a search engine 320 for searching or pulling expertise information from at least one source and a graphical user interface 325 in communication with the search engine 320 for displaying the expertise information and messages in a collaboration environment. As used herein, "in communication" includes physical and wireless connections that are indirect through one or more additional components (or over a network) or directly between the two components described as being in communication. The at least one device 310 and graphical user interface 325 may comprise, or be in communication with, a controller 330 for highlighting words and/or recipient names based on obtained expertise information according to a user preference. The controller 330 may comprise one or more processors having embedded application logic or program code.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) present on a computer storage medium or computer program product, or an embodiment combining software and hardware aspects that may all generally be referred to herein as a "circuit," "module" or "system." Furthermore, aspects of the present invention may take the form of a computer program product embodied in at least one computer readable medium having computer readable program code embodied thereon.

Any combination of at least one computer readable medium may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having at least one wire, portable computer diskette, hard disk, random access memory (RAM), read-only memory (ROM), erasable programmable read-only memory (EPROM or Flash memory), optical fiber, portable compact disc read-only memory (CD-ROM), optical storage device, magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of at least one programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute with the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 4:
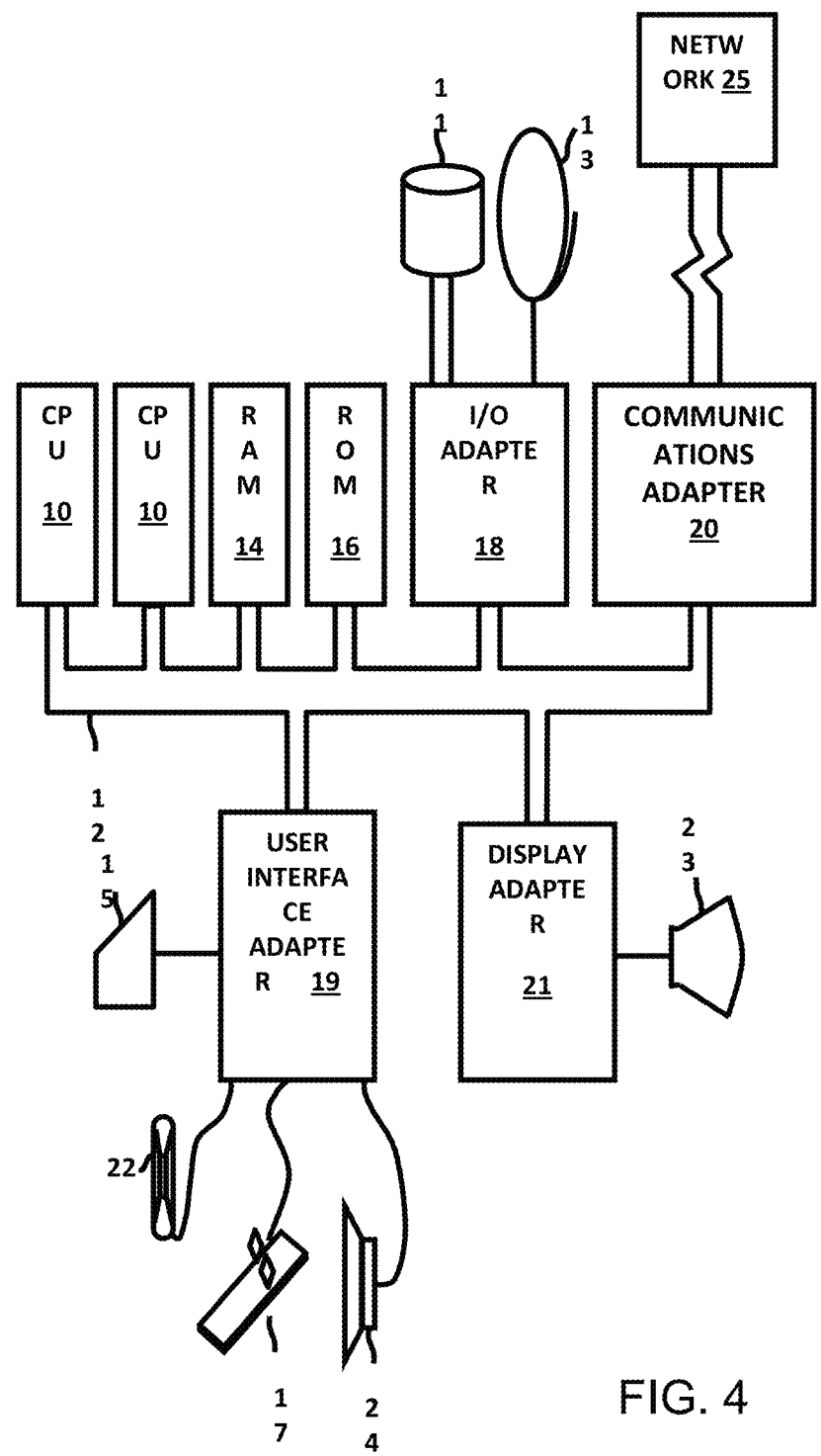
FIG. 4 is a schematic diagram of another system according to an embodiment of the present invention.

Referring now to FIG. 4, a representative hardware environment for practicing at least one embodiment of the invention is depicted. This schematic drawing illustrates a hardware configuration of an information handling/computer system in accordance with at least one embodiment of the invention. The system comprises at least one processor or central processing unit (CPU) 10. The CPUs 10 are interconnected with system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of at least one embodiment of the invention. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the root terms "include" and/or "have", when used in this specification, specify the presence of stated features, integers, steps, operations, elements, and/or components, but do not preclude the presence or addition of at least one other feature, integer, step, operation, element, component, and/or groups thereof.

The corresponding structures, materials, acts, and equivalents of all means plus function elements in the claims below are intended to include any structure, or material, for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for prompting expertise in a collaboration environment, comprising:
    entering a name of at least one recipient for a message for a collaboration environment in a graphical user interface;
    obtaining expertise information for each of the at least recipient based on a context of the message;
    drafting the message;
    highlighting at least one word of the message that is associated with the obtained expertise information in the graphical user interface;
    in response to a user hovering over the highlighted at least one word, simultaneously displaying:
    a name of at least one recipient that corresponds to the highlighted at least one word, said highlighted at least one word being associated with the obtained expertise information; and
    a source of the obtained expertise information, said highlighted at least one word being associated with the obtained expertise information, wherein the source is at least one member selected from a group consisting of a company's internal computer system, a social networking site, government records, manual tagging by a user, or collaborative tagging.

2. A method according to claim 1, wherein the source of the expertise information is chosen by the user who drafts the message.

3. A method according to claim 1, wherein said highlighting the at least one word comprises at least one of: an animation, a media file, a change of style, or web linkage.

4. A method according to claim 3, wherein the change of style comprises at least one of a change of color, a change of font size, background color, font family, font decoration, or a font weight.

5. A method according to claim 1, wherein the name of the at least one recipient is displayed via a balloon, list, or menu in the graphical user interface.

6. A method according to claim 1, further comprising highlighting a name of at least one recipient.

7. A method according to claim 6, wherein the name of the at least one recipient is highlighted or styled.

8. A method according to claim 6, wherein a plurality of recipient names is displayed in a tag-cloud.

9. A method according to claim 6, wherein each recipient is assigned an expertise number.

10. A method according to claim 1, further comprising re-scanning the message each time a new recipient is added.

11. A method according to claim 1, further comprising storing the obtained expertise information with a message in an electronic database when the message is sent, posted, or delivered.

12. A method according to claim 1, wherein the collaboration environment comprises an email environment or system.

13. A method according to claim 1, wherein said drafting is pursuant to an invitation, wherein the invitation displays an overall knowledge or expertise level of an audience.

14. A method according to claim 1, further comprising recommending at least one expert based on content of a message or a recipient list.

15. A method according to claim 14, comprising recommending adding at least one expert based on addition of a word to the message.

16. A method according to claim 14, comprising recommending deleting at least one expert based on removal or deletion of a word from the message.

17. A method for prompting expertise in a collaboration environment, comprising:
    drafting a message to at least one recipient in a graphical user interface;
    obtaining expertise information for the at least one recipient based on a context of the message;
    highlighting at least one word of the message matching the obtained expertise information for at least one recipient in the graphical user interface;
    in response to a user hovering over the highlighted at least one word, simultaneously displaying:
    a name of the at least one recipient that corresponds to the highlighted at least one word in response to a user hovering the highlighted at least one word, the highlighted at least one word being associated with the obtained expertise information; and
    a source of the obtained expertise information, said highlighted at least one word being associated with the obtained expertise information, wherein the source is at least one member selected from a group consisting of a company's internal computer system, a social networking site, government records, manual tagging by a user, or collaborative tagging;
    and
    changing the message in real-time based upon the obtained expertise information.

18. A system for prompting expertise in a collaboration environment, comprising:
    at least one electronic or digital device;
    a search engine for pulling or obtaining expertise information for at least one recipient of a message in a collaboration environment based on a context of the message;
    a controller for highlighting at least one of words or recipient names in the message corresponding to the obtained expertise information; and a graphical user interface in communication with the search engine and the controller for displaying the message and the obtained expertise information, the recipient names in the message corresponding to the expertise information, and a source of the obtained expertise information, wherein the source is at least one member selected from the group consisting of a social networking site, government records, manual tagging by a user, or collaborative tagging, and wherein the system is configured to simultaneously display both the recipient names in the message corresponding to the obtained expertise information, and the source of the obtained expertise information in response to a user hovering over the highlighted at least one word, said highlighted at least one word corresponding with the obtained expertise information.

19. A system according to claim 18, wherein the controller comprises one or more processors with embedded computer code or application logic.

20. A computer program product for prompting expertise in a collaboration environment, comprising:
   a computer readable storage medium;
   first program instructions to draft a message for a collaboration environment in a graphical user interface;
   second program instructions to enter a name of at least one recipient for the message;
   third program instructions to obtain expertise information for the at least one recipient based on a context of the message;
   fourth program instructions to highlight at least one word of the message that is associated with the obtained expertise information in the graphical user interface;
   fifth program instructions to simultaneously display:
      a name of at least one recipient that corresponds to the highlighted at least one word in response to a user hovering over the highlighted at least one word, said highlighted at least one word being associated with the obtained expertise information; and
      a source of the obtained expertise information in response to a user hovering over the highlighted at least one word, the highlighted at least one word being associated with the obtained expertise information, wherein the source is at least one member selected from the group consisting of a social networking site, government records, manual tagging by a user, or collaborative tagging, and
   wherein said first, second, third, fourth, and fifth program instructions are stored on said computer readable storage medium.

* * * * *